Oct. 7, 1969     KOZO SHIOMI     3,471,748
PROTECTIVE DEVICE FOR A SERIES CONDENSER
Filed Dec. 27, 1966
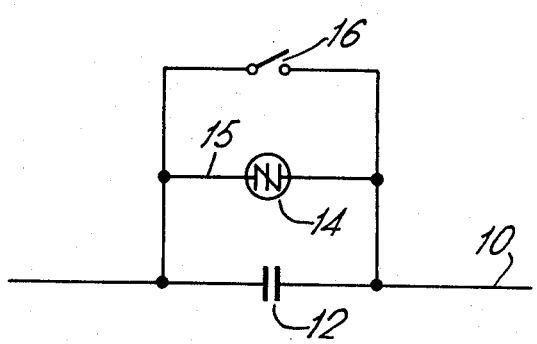
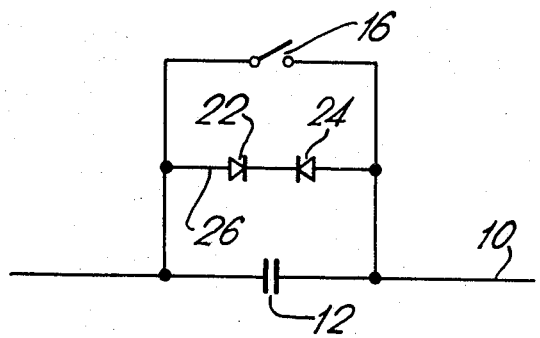
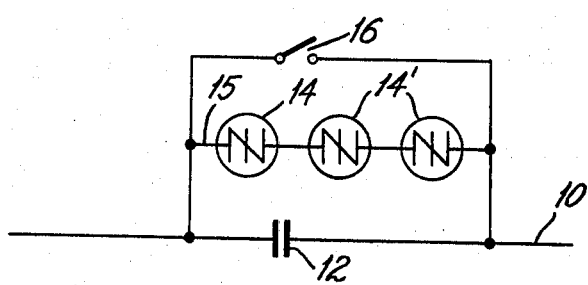
INVENTOR
KOZO SHIOMI
BY
Christensen, Sanborn, & Matthews
ATTORNEYS United States Patent Office 3,471,748
Patented Oct. 7, 1969

3,471,748
PROTECTIVE DEVICE FOR A SERIES
CONDENSER
Kozo Shiomi, 20 Umezu Takase-cho,
Ukyo-ku, Kyoto, Japan
Filed Dec. 27, 1966, Ser. No. 605,053
Int. Cl. H02h 7/16
U.S. Cl. 317—12                                9 Claims

ABSTRACT OF THE DISCLOSURE

This invention relates to a device for protecting a series condenser inserted in a transmission or distribution line from abnormal voltages. Shunting circuits having one or more semiconductor elements such as silicon symmetrical switches or controlled avalanche rectifiers connected in series circuit across the condenser are disclosed.

---

As is well known, a condenser is connected in a transmission or distribution line in series with a load to compensate for voltage drop caused by the inductance of the line, to reduce the rate of fluctuation of the line voltage, to maintain the receiving-end voltage, to increase the transmission capacity and to improve the stability of the line. Experience shows that some disorders in the line such as caused by lightning voltages being impressed thereon cause an abnormal voltage to be impressed on the series condenser. To protect the series condenser from such abnormal voltages, it has been customary to connect a shunting device across the series condenser to by-pass the abnormal voltages. In the prior art, a pair of electrodes opposed across a discharging air-gap or a parallel combination of oppositely poled ignitrons have been in wide use as such a shunting device. In the former, however, once the length of the discharging air-gap has been determined, protection cannot be provided against voltages lower than the discharging voltage for that air-gap length. Moreover, the arcing erosion and deterioration of the elecerodes caused by discharge make repeated use of the device impossible without readjustment of the air-gap length or replacement of the electrodes. In the latter, it is necessary to detect abnormal voltages impressed on the series condenser and upon such detection, to fire the ignitrons to bypass the series condenser, and therefore, devices for these purposes must additionally be provided, with resulting complication in the whole arrangement of the shunting device. Moreover, due to its construction, the ignitron cannot be set aslant or sideways. This places a restriction on the manner and position for providing the device on the line.

Accordingly, it is one object of the invention to provide a device for protecting a series condenser inserted in a transmission or distribution line against abnormal voltages that may be impressed on the condenser.

Another object of the invention is to provide a protective device for shunting abnormal voltages off a series condenser inserted in a transmission or distribution line.

A further object of the invention is to provide such a protective device as aforesaid which is simple in construction, stable and reliable in operation, free of disorders, long in life, easy in maintenance and low in cost.

In accordance with this invention, a shunting circuit including a semiconductor element is connected across the series condenser. The semiconductor element employed in this invention has no control electrode and is of such characteristics that the phenomemon known as "avalanche" takes place when a voltage exceeding a predetermined value has been impressed on the element. As such a semiconductor element, a silicon symmetrical switch or controlled avalanche rectifier may advantageously be used. The silicon symmetrical switch and controlled avalanche rectifier will be referred to as SSS and CAR, respectively, hereinafter.

The SSS has an n-p-n-p-n structure and is of such characteristics that when a voltage higher than a predetermined value has been impressed thereon, regardless of its polarity, avalanche occurs therein to reduce its resistance to the state of conduction. The voltage enough to cause avalanche will be referred to as the avalanche voltage. Upon conduction of the SSS, the large current flows through it and not through the series condenser, thereby protecting the latter from damage. When the abnormal voltage disappears, the original high resistance of the SSS is restored so that normal current will again flow through the series condenser.

The CAR is a kind of p-n junction diode, in which when a voltage higher than a predetermined value is applied in the reverse direction, avalanche occurs to cause conduction of the CAR.

In one embodiment of the invention, an SSS is simply connected across the series condenser. In another embodiment, a series combination of a pair of oppositely poled CAR's are connected across the series condenser.

The invention will be better understood from the following description with reference to the accompanying drawings, wherein:

FIG. 1 is a circuit diagram of one embodiment of the invention; and FIG. 2 is a circuit diagram of another embodiment of the invention.

Referring to the drawings, there is shown a transmission or distribution line 10 having a series condenser 12. In FIG. 1, a shunt circuit 15 comprising a single SSS 14 is connected across the series condenser 12. A bypass switch 16 may advantageously be connected across the SSS. If, after the SSS has been rendered conductive, it remains so for a long time, the large current flowing therethrough might eventually cause damage to the SSS. To prevent this, the switch 16 may be closed to bypass the SSS, as well as the series condenser.

Under the normal condition, a predetermined normal amount of current flows through the series condenser 12, so that the terminal voltage across the condenser is kept at a predetermined normal level. The voltage, also applied to the SSS 14, is yet lower than the avalanche voltage of the SSS so that the SSS remains non-conductive.

Suppose that an abnormally large current flows through the line 10 for some cause or other. This increases the terminal voltage of the series condenser until it exceeds the avalanche voltage of the SSS, whereupon the SSS changes from its non-conductive to conductive condition, thereby shunting the abnormal current off the series condenser. When the abnormal condition has disappeared, with resulting drop of the terminal voltage of the series condenser, the SSS is restored to its original non-conductive condition. It is necessary that the avalanche voltage of the SSS be substantially equal to the terminal voltage of the series condenser that must be bypassed. If the avalanche voltage of a single SSS is too low, as many of them as are needed may be provided in a series combination to attain the required value of avalanche voltage. This is shown by FIGURE 1A which corresponds to FIGURE 1 but includes further devices 14'.

In FIG. 2, a circuit 26 comprising a series combination of oppositely poled CAR's 22 and 24 is connected in parallel with the series condenser 12. The two CAR's have their anodes connected to each other. Alternatively, their cathodes may also be connected to each other. In the illustrated arrangement, if in one half of a cycle, the terminal voltage of the series condenser is impressed on the CAR 24 in the reverse direction, in the other half it is impressed in the other CAR 22 in the reverse direction.

Under the normal condition, the terminal voltage of the series condenser 12 is lower than the avalanche voltage of the CAR's, so that the shunting circuit 26 remains non-conductive. Under an abormal condition, when the voltage impressed on the condenser increases above the avalanche voltage of the CAR's, avalanche occurs so that the CAR's become conductive, thereby bypassing the series condenser. If the two CAR's do not suffice, as many pairs of them as are necessary may be used.

It is now believed to have become apparent that the invention provides a new and useful protective device for a series condenser inserted in a transmission or distribution line. The device of the invention can provide a protection over a wider range of voltage than the discharging air-gap type of device, which is unable to protect against comparatively low voltages. Also, the device of the invention can be used repeatedly and stably without any readjustment of the component parts. The ignitron type of device requires means for detecting the terminal voltage of the series condenser and means for providing a control signal to be applied to the control electrode of the ignitrons. The device of the invention requires no such additional means and, consequently, is much simpler in construction.

What I claim is:

1. A device for protection of a series condenser inserted in a transmission or distribution line, comprising a shunt circuit connected across said series condenser and including at least one semiconductor element having no control electrode and being of such characteristics that upon impression on said element of a voltage higher than the voltage being applied to said series condenser under the normal condition of said line, avalanche occurs in said element to render the same conductive, thereby bypassing said series condenser.

2. The device as defined in claim 1, further including a bypass switch connected across said shunt circuit.

3. The device as defined in claim 1, wherein said semiconductor element is a silicon symmetrical switch.

4. A device for protection of a series condenser inserted in a transmission or distribution line, comprising a shunt circuit connected across said series condenser and including a series combination of a plurality of silicon symmetrical switches.

5. The device as defined in claim 4, further including a bypass switch connected across said series combination.

6. A device for protection of a series condenser inserted in a transmission or distribution line, comprising a shunt circuit connected across said series condenser and comprising a series combination of a pair of oppositely poled controlled avalanche rectifiers.

7. The device as defined in claim 6, further including a bypass switch connected across said shunt circuit.

8. A device for protection of a series condenser inserted in a transmission or distribution line, comprising a shunt circuit connected across said series condenser and comprising a series combination of a plurality of pairs of oppositely poled controlled avalanche rectifiers.

9. The device as defined in claim 8, further including a bypass switch connected across said shunt circuit.

References Cited

UNITED STATES PATENTS

| | | | |
|---|---|---|---|
| 2,356,589 | 8/1944 | Hessenberg | 317—12 |
| 2,758,254 | 8/1956 | Kramer | 317—11 |
| 2,991,396 | 7/1961 | Schurr | 317—11 |
| 3,209,241 | 9/1965 | Book et al. | 317—12 |
| 3,249,813 | 5/1966 | Price et al. | 317—12 |

LEE T. HIX, Primary Examiner

R. V. LUPO, Assistant Examiner